United States Patent [19]

Lampe

[11] 3,897,376

[45] *July 29, 1975

[54] ROOM TEMPERATURE VULCANIZABLE SILICONE RUBBER COMPOSITION

[75] Inventor: Warren R. Lampe, Ballston Lake, N.Y.

[73] Assignee: General Electric Company, Waterford, N.Y.

[ * ] Notice: The portion of the term of this patent subsequent to Oct. 3, 1989, has been disclaimed.

[22] Filed: Mar. 17, 1972

[21] Appl. No.: 235,822

Related U.S. Application Data

[62] Division of Ser. No. 76,265, Sept. 28, 1970, Pat. No. 3,696,090.

[52] U.S. Cl.......... 260/18 S; 128/152; 260/33.6 SB; 260/33.8 SB; 260/37 SB; 260/46.5 G; 260/825; 264/222; 264/DIG. 30
[51] Int. Cl. .............................................. C08f 21/01
[58] Field of Search .............. 260/825, 46.5 G, 18 S

[56] References Cited
UNITED STATES PATENTS

| | | | |
|---|---|---|---|
| 2,985,546 | 5/1961 | Leavitt | 260/46.5 G |
| 3,070,566 | 12/1962 | Nitzsche et al. | 260/46.5 G |
| 3,127,363 | 3/1964 | Nitzsche et al. | 260/46.5 G |
| 3,696,090 | 10/1972 | Lampe | 260/18 |

*Primary Examiner*—Melvyn I. Marquis
*Attorney, Agent, or Firm*—Donald J. Voss, Esq.; E. Philip Koltos, Esq.; Frank L. Neuhauser, Esq.

[57] ABSTRACT

A room temperature vulcanizable silicone rubber composition comprising (a) a high molecular weight liquid diorganopolysiloxane having terminal hydroxy groups bonded to the silicon atom and a viscosity of 3 $\times 10^6$ to 2 $\times 10^8$ centipoise at 25°C, (b) 0–60 percent by weight of said high molecular weight organopolysiloxane of a low molecular weight liquid organopolysiloxane having terminal hydroxy groups bonded to the silicon atoms and a viscosity of 100 to 3.0 $\times 10^5$ centipoise at 25°C. There is also present a filler and an alkyl silicate which acts as the cross-linking agent during curing of the composition. As a catalyst there is used a metallic salt of an organic monocarboxylic acid. The composition may be mixed and placed in the ear canal to form an ear plug in situ.

6 Claims, No Drawings

ROOM TEMPERATURE VULCANIZABLE SILICONE RUBBER COMPOSITION

This application is a division of copending application Ser. No. 76,265 filed Sept. 28, 1970, and now U.S. Pat. No. 3,696,090.

BACKGROUND OF THE INVENTION

The present invention relates to a room temperature vulcanizable composition and, in particular, to a two-package room temperature vulcanizable composition which is relatively non-tacky and handleable prior to curing and after all the ingredients have been mixed together which, upon curing, forms an elastic silicone rubber with good physical properties.

Organopolysiloxane compositions which cure at elevated temperatures with the use of peroxide catalysts have been known for some time. It was found that such compositions did not meet many uses since they must be cured at high temperatures. Such curing is not possible when the organopolysiloxane is applied in such a manner so that it is exposed to the atmosphere while it cures. Curing at high temperatures is entirely unfeasible when the organopolysiloxane composition is to be used to caulk windows. Further, the peroxide catalysts, upon decomposing, create gas bubbles in the composition so that the silicone compositions will cure with gas bubbles therein unless the curing procedure is carried out under pressure.

In order to solve these difficulties, as well as other difficulties with heat-cured rubber, two-component room temperature curable silicone rubber was devised. As shown and disclosed in Berridge U.S. Pat. 2,843,555, such room temperature curable rubber comprises a hydroxyterminated diorganopolysiloxane having a viscosity of less than 80,000 centipoise at 25°C, mixed with an appropriate filler. The other component of the system comprises an alkyl silicate or a partially hydrolyzed alkyl silicate which is used with a curing catalyst selected from certain metallic salts of organic carboxylic acids such as lead or tin octoate. Such a composition has the main advantage that when the two components are mixed together, the composition can be molded and cured in place at room temperature. While these compositions are advantageous having many uses over the heat curable silicone rubber compositions, they have certain disadvantages in certain applications which makes them very difficult to work with or unsuitable.

Thus, it has been suggested that such two-component room temperature vulcanizable composition can be used to make molds of teeth by simply taking a sample of the mixed composition and having the individual make an impression therein and then allow the rubber to cure about the individual's teeth so that a mold may be formed. The cured mold can then be removed after 20–30 minutes so that false teeth may be formed from the mold.

Another use that has been suggested is that the two-component compositions be placed in a syringe or other device and inserted from the device into the ear so that the composition can cure in situ to form an ear plug for the attenuation of sound. It should be mentioned briefly that such ear plugs which are formed in situ are much more confortable to the wearer and will keep the transmission of sound to a minimum.

The material is placed in a syringe so that it may be inserted into the ear since it is of such low viscosity and so tacky just after mixing the two components together that it is difficult to manually handle it. Further, in order to prevent the silicone composition from flowing into the inner ear, the canal is stuffed with cotton prior to the insertion of the silicone material. In addition, the subject must tilt his head to the side to maintain the silicone material in place while it is curing. In order to obviate some of these difficulties, it has been suggested that the silicone rubber composition be allowed to cure until it is in the form of a thick paste before it is inserted into the ear. However, if this is done, then the handleability time during which the silicone composition can be manipulated before permanent setting has been reached in this composition is very small as that there is not sufficient time to mold the composition to the desired state before permanent setting takes place. Thus, with each composition it usually takes 10–15 minutes before the silicone rubber composition has cured to the point it is substantially tack-free and in the form of a thick paste. However, two to three minutes past the tack-free state, the composition cures to its permanent setting position so that there is too little time for molding the composition into the proper form.

In order to obviate these difficulties, large amounts of fillers were molded into the low viscosity silicone rubber composition so as to form a thick paste. Additionally, it has been suggested that inorganic and organic thickening agents, such as hydrogenated castor oil, be incorporated into the silicone rubber composition so as to form a thick paste which is substantially tack-free and can readily be molded by hand as soon as it starts to cure to form ear plugs or dental impressions or any other item where hand molding is necessary. However, such thick paste produced by the addition of excessive amounts of filler or by the use of thickening agents suffer in that there are produced cured silicone rubber compositions with poor physical properties. In particular, inferior elongation and tear strength which makes the resulting ear plugs unsuitable since they cannot withstand continual use.

With respect to physical properties, it should be noted that the room temperature vulcanizable materials such as that disclosed in the Berridge patent did not have sufficient toughness, (otherwise known as the tensile product), elongation, and tear strength as was required for certain applications. In particular, it was also desired to dissolve the room temperature vulcanizable compositions in solvent and then apply the solution over a surface such as a roof top so that upon the evaporation of the solvent and the curing of the silicone rubber, a tough film of silicone rubber will be formed over the roof top surface. In particular, it was desired that a room temperature vulcanizable composition be provided with a tear strength of at least 40 lb./in. and preferably of at least 60 lb./in., an elongation of at least 200 percent and an ultimate tensile product (which is ultimate tensile strength times ultimate elongation) of at least 100,000 psi.

Thus, one object of the present invention was to provide a room temperature vulcanizable silicone rubber composition that is easily molded by hand and substantially tack-free for a substantial amount of time during the precure period.

It is another object of the present invention to provide a room temperature vulcanizable silicone rubber composition that has high tear strength, percent elongation and tensile product so that it is suitable for forming tough protective films.

It is yet another aim of the present invention to provide a room temperature vulcanizable silicone rubber composition that can readily be molded to form ear plugs in situ, which ear plugs can withstand excessive use.

These and other objects of the present invention can be achieved by means of the invention illustrated below.

SUMMARY OF THE INVENTION

In accordance with the present invention there is provided a room temperature silicone rubber composition which is readily moldable by hand and has little tackiness or cold flow prior to cure comprising (a) a linear high molecular weight fluid diorganopolysiloxane containing terminal silicon-bonded hydroxy groups and having a viscosity of $3 \times 10^6$ to $2 \times 10^8$ centipoise at 25°C where the organic radicals of the aforesaid organopolysiloxane represent monovalent hydrocarbon radicals, (b) 0–100 percent by weight of said high molecular weight diorganopolysiloxane of a linear, low molecular weight fluid organopolysiloxane containing terminal silicon-bonded hydroxy groups and having a viscosity within the range of 100 to $3.0 \times 10^5$ centipoise at 25°C where the organic radicals of the low molecular weight organopolysiloxane represent monovalent hydrocarbon radicals (c) a filler, (d) an alkyl silicate selected from the class consisting of (1) a non-ionic organosilicate corresponding to the general formula, (1) 

where R is a radical selected from the class consisting of alkyl radicals, haloalkyl radicals, aryl radicals, haloaryl radicals, aralkyl radicals, alkenyl radicals, cycloalkyl radicals, cycloalkenyl radicals and cyanoalkyl radicals, and R' is selected from the class consisting of alkyl, haloalkyl, aryl, alkenyl, haloaryl, cycloalkyl and cycloalkenyl, alkoxy and aryloxy radicals, and (2) a liquid partial hydrolysis product of the aforementioned organosilicate monomeric compounds, and (e) a metallic salt of a monocarboxylic and dicarboxylic acid in which the metal ion is selected from the class consisting of lead, tin, zirconium, antimony, iron, cadmium, barium, calcium, titanium, bismuth and manganese.

The high molecular weight diorganopolysiloxane preferably has the formula, (2) 

where $R^2$ is selected from alkyl, aryl, haloalkyl, haloaryl, alkenyl, alkaryl, aralkyl, haloalkenyl, cyanoalkyl, cycloalkyl and cycloalkenyl and $n$ has a value of at least 2180.

The low molecular weight organopolysiloxane has the formula.

(3) 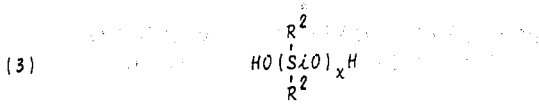

where $R^2$ has been defined above and $x$ has a value of from 125 to 1150. Preferably, $R^2$ in formulas (2) and (3) is methyl.

A blend of the organopolysiloxanes is used having a resulting viscosity of generally $3 \times 10^6$ to $25 \times 10^6$ and preferably $3 \times 10^6$ to $4.5 \times 10^6$ centipoise at 25°C for producing molding compositions for forming ear plugs. It is not necessary to add any of the low molecular weight organopolysiloxane to the high molecular weight organopoly-siloxane to form a blend of the high molecular weight polysiloxane which has a viscosity of generally $3 \times 10^6$ to $25 \times 10^6$ and preferably $3 \times 10^6$ to $4.5 \times 10^6$ centipoise at 25°C by itself.

Further, in place of the linear low molecular weight polymer of formula (3) there may be utilized a branched or straight polymer compound of $(R^2)_2SiO$ units, $(R^2)_3SiO_{1/2}$ units and $R^2SiO_{3/2}$ units where there are present 0.1 to 8 per cent by weight hydroxy radicals and the viscosity of the polymer is between 700 to $3.0 \times 10^5$ centipoise at 25°C. The ratio of the organosiloxy units to the diorganosiloxy units is from 0.11 to 1.4 and the ratio of the triorganosiloxy units to the diorganosiloxy units from 0.02 to about 1, inclusive. However, the linear polymer of formula (3) is preferred in the present invention.

DESCRIPTION OF THE PREFERRED EMBODIMENT

The radicals $R^2$ are selected from the class consisting of alkyl radicals, such as methyl, ethyl, propyl, butyl, hexyl, etc.; aryl radicals such as phenyl, diphenyl, naphthyl, etc.; alkenyl radicals such as tolyl, xylyl, ethylphenyl, etc.; aralkyl radicals such as benzyl, phenylethyl, etc.; haloaryl and haloalkyl such as chlorophenyl, tetrachlorophenyl, difluorophenyl, etc.; and alkenyl radicals such as vinyl, allyl, etc. Further, $R^2$ may also represent cyanoalkyl, cycloalkyl and cycloalkenyl radicals. The $R^2$ groups attached to a single silicon radical may be the same groups or different groups. It has been found that at least 50 per cent and preferably 70–100 per cent of the $R^2$ groups in the diorganopolysiloxane molecule should be methyl. Further, the diorganopolysiloxane can be a homopolymer or a copolymer such as that, for example, it has different types of units in the chain such as dimethyl, diphenyl, methylphenyl, etc.

The organopolysiloxanes of formulas (2) and (3) may also be represented by the average unit formula, (4) $R^2_m SiO_{(4-m)/2}$ where $R^2$ is defined above and the value of $m$ may vary from 1.99 to 2. The average unit formula includes organopolysiloxanes having terminal groups other than hydroxy such as monofunctional and trifunctional terminal groups. However, in the present case it is preferred that the terminal groups be hydroxy and the monofunctional and trifunctional groups be kept to a minimum.

Preparation of the diorganopolysiloxanes of formulas (2), (3) and (4) may be carried out by any of the procedures well known to those skilled in the art. Such polysiloxanes can be produced by following a procedure involving hydrolysis of one or more hydrocarbon substituted dichlorosilanes in which the substituents consist of saturated or unsaturated hydrocarbon groups to produce a crude hydrolyzate containing a mixture of linear and cyclic polysiloxanes. The crude hydrolyzate is then treated with a suitable catalyst such as KOH so that it can be depolymerized to form a mixture of low boiling, low molecular weight cyclic polymers and undesirable materials such as the monofunctional-trifunctional chlorosilane starting material. The resulting composition is fractionally distilled and there is obtained a pure product containing the low boiling, low molecular weight cyclic polymers free of any significant amount of monofunctional and trifunctional groups.

In order to depolymerize the crude hydrolyzate, there is added to said hydrolyzate, KOH and a diphenyl solvent and the mixture is heated at a temperature in the range of 150°C to 175°C under an absolute pressure of 100 mm of Hg. to produce and remove by evaporation a product consisting of low molecular weight cyclic polysiloxanes comprising for example, about 85 percent of the tetramer and 15 per cent of the mixed trimer and pentamer. Among the cyclic polymers that may so be produced are hexamethylcyclotrisiloxane, octamethylcyclotetrasiloxane and dimethylcyclopentasiloxane. There also may be formed mixtures of cyclopolysiloxanes such as a mixture of octamethylcyclotetrasiloxane and ethylmethylcyclotetrasiloxane, and mixtures of cyclic polymers of dimethylsiloxane with cyclic polymers of diphenylsiloxane, cyclic methylphenylsiloxanes and cyclic methylvinylsiloxanes.

The pure cyclic polysiloxanes are mixed in the desired proportions to obtain the above defined mixture. Then the mixture of the cyclic polysiloxanes are subjected to an equilibration procedure to obtain the diorganopolysiloxane of formula (2). The equilibration is preferably carried out at temperatures of about 125°C to 150°C in the presence of a small amount of rearrangement catalyst such as potassium hydroxide, tetrabutyl phosphonium hydroxide, etc. The amount of catalyst used will depend on the extend of the polymerization desired. Generally, 5–10 ppm (parts per million) of the catalyst is sufficient for the polymerization to produce diorganopolysiloxane polymers of a viscosity of $3 \times 10^6$ to $2 \times 10^8$ centipoise measured at 25°C. There is also present in the reaction mixture 15–150 ppm (parts per million) of water based on the cyclic polymer so as to supply the hydroxy groups which function as chain-stoppers for the linear diorganopolysiloxane material that is formed. After the equilibration reaction has proceeded for two hours there is reached an equilibration point wherein the mixture contains about 85 percent linear polymers and the amount of linear polymers being formed from the cyclic polymers is equal to the cyclic polymers being formed from the linear polymers.

When this equilibration point has been reached there is added to the mixture a sufficient amount of an acid donor that will neutralize the KOH catalyst so as to terminate the polymerization reaction. Preferably, 1.7 per million of tris-[(2-chloroethylphosphite) are added to the reaction mixture to liberate HCl which reacts with and neutralizes the KOH and so terminates the equilibration reaction. The cyclic diorganosiloxanes in the reaction mixture are then distilled off to leave the polydiorganosiloxane gum which is useful in the present invention. The resulting linear diorganopolysiloxanes are chain-stopped primarily with hydroxy groups and have a viscosity of $3 \times 10^6$ to $2 \times 10^8$ centipoise at 25°C. Further, the number of diorgano substituent groups in the siloxane chain is at least 3,180. If these linear polymers have a viscosity by themselves of generally $3 \times 10^6$ to $25 \times 10^6$ and preferably $3 \times 10^6$ to $4.5 \times 10^6$ centipoise at 25°C, they can be used by themselves to form ear plugs since this material, when compounded with a filler and a cross-linking agent, has the proper consistency, is substantially tackless in the pre-cured state and cures to the solid, elastic state with good tear strength, per cent elongation and tensile product. This viscosity range has suitable properties if it is mixed with 50 parts of filler. However, broadly, linear polymers with a viscosity range of $3.0 \times 10^6$ to $25 \times 10^6$ centipoise at 25°C can be mixed with suitable amounts of filler to arrive at compositions suitable for forming ear plugs. These compositions can be arrived at by a single linear polymer having this viscosity or a blend of low viscosity and high viscosity linear polymers.

High molecular weight diorganopolysiloxanes having a viscosity of $5 \times 10^5$ centipoise at 25°C and above can be treated with water to arrive at low molecular weight diorganopolysiloxanes having a viscosity of 100 to 300,000 centipoise at 25°C. This may be accomplished by blowing steam across the surface of the high molecular weight product or through the polymer for a sufficient length of time to obtain the low molecular weight component having the desired silanol content. Thus, it is desirable to obtain the low molecular weight diorganopolysiloxane of formula (3) from a portion of the high molecular weight diorganopolysiloxanes by the above water treatment well known to those skilled in the art so as to reduce the number of diorganosiloxy units from above 2,180 to a value of 125 to 1150. The use of steam in this fashion will cause a decrease in the viscosity of the polymer while at the same time the formed linear polysiloxane will have terminal silicon-bonded hydroxy groups.

Alternatively, the low molecular weight diorganopolysiloxanes can be produced from the high molecular weight diorganopolysiloxane by adding water to them and heating the resulting composition at elevated temperatures of 150°C to 170°C so as to break up the long chain polymers into smaller chains. The amount of water used will vary depending upon such factors as the molecular weight of the polymer being treated, the time, and temperature at which the mixture of high molecular weight diorganopolysiloxanes are heated and the desired viscosity. These conditions may readily be determined, for example, a high molecular weight diorganopolysiloxane having a viscosity of 2,000,000 centipoise at 25°C may be heated to 150°C with 0.5 per cent by weight of water for two hours to arrive at a low molecular weight organopolysiloxane of formula (3) having a viscosity of 2,000 centipoise. Preferably, the low molecular weight organopolysiloxane is produced so that it has a viscosity of 2,000 to 3,000 centipoise at 25°C.

Thus, if it is desired to produce ear plugs and the high molecular weight diorganopolysiloxane has a viscosity of generally above $25 \times 10^6$ and preferably about $4 \times 10^6$ centipoise, then 0 to 1–0 percent by weight and preferably 1–20 percent by weight of low molecular weight diorganopolysiloxane fluid is blended with the high molecular weight organopolysiloxane so that the resulting fluid has a viscosity of $3 \times 10^6$ to $4 \times 10^6$ centipoise. For example, 80 parts of 7 to $10 \times 10^6$ centipoise material is blended with 20 parts of 3,000 centipoise material to give a resulting blend of 100 parts of $3 \times 10^6$ centipoise polysiloxane material. This blend may then be used to form ear plugs, dental molds or prosthetic devices since it will not flow and is easily handleable while maintaining a paste-like consistency in the pre-cured state. Where the high molecular weight polysiloxane has a viscosity of $25 \times 10^6$ to $2 \times 10^8$ centipoise at 25°C, then it is necessary to blend therein large amounts of the low molecular weight material to arrive at a blend having a viscosity of $3 \times 10^6$ to $25 \times 10^6$ centipoise at 25°C, which blend is suitable for producing tough films and molded silicone rubber parts. For other uses, such as for forming tough films, the diorganopolysiloxane, whether it is a blend or not, preferably has a viscosity of $3 \times 10^6$ to $25 \times 10^6$ centipoise at 25°C.

In order for the diorganopolysiloxane fluids to cure there must be present in the composition the cross-linking agent of formula (1). In that formula, R groups may be alkyl radicals such as methyl, ethyl, propyl, isopropyl, butyl, amyl, isoamyl, octyl, isooctyl, decyl, dodecyl; haloalkyl such as the chlorinated brominated fluorinated alkyl radicals. In addition, R may represent aryl, aralkyl and alkenyl radicals such as vinyl, allyl, phenyl, tolyl, xylyl, benzyl, phenylethyl, naphthyl, anthracyl, biphenyl, as well as the halogen-substituted derivatives of the above radicals. In addition, R may represent cycloalkenyl, cycloalkyl and cyanoalkyl radicals. The radical R' represents the same radicals as R and, in addition, preferably represents alkoxy and aryloxy radicals such as methoxy, ethoxy, butoxy and phenoxy.

In addition to the monomeric organosilicates of formula (1), there is also preferably used as a cross-linking agent, liquid partially hydrolyzed products of the monomeric silicates. Such hydrolysis products are obtained by effecting partial hydrolysis in water of the particular monomeric organosilicate in the presence of small amounts of acid to a point where it is still water-insoluble and still possible to isolate a liquid, partially hydrolyzed organosilicon compound. Thus, the ethyl silicate having the formula $(C_2H_5O)_4Si$ may be partially hydrolyzed by adding acids or acid-forming metal salts to the liquid monomeric organosilicate such as $FeCl_3$, $CuCl_2$, $AlCl_3$, $SnCl_4$ and thereafter effecting suitable hydrolysis of this mixture of ingredients in water to obtain the two-phase composition from which the water-insoluble, partially hydrolyzed organosilicate can readily be separated from the aqueous phase and catalyst. The partially hydrolyzed ethylsilicate is sold under the tradename Ethyl Silicate-40, by Union Carbide Corporation.

Generally, there is added 0.1 to 15.0 percent by weight of the cross-linking agent of formula (1) and preferably 0.1 to 10 percent by weight based on the weight of the diorganopolysiloxane of formulas (2) and (3). If more than 15.0 percent by weight of cross-linking agent is used, the excess does not function as a cross-linking agent since the initial hydroxy positions on the organopolysiloxane are already reacted with the cross-linking agent and the excess acts as a filler which reduces the elasticity of the cured silicone rubber composition. If less than 0.1 percent by weight of cross-linking agent is used, there is not sufficient cross-linking agent to react with the organopolysiloxane to form the cured silicone rubber.

Although the preferable cross-linking agents are organosilicates, there may also be used as cross-linking agents organopooysiloxane resins having a functionality greater than 2 and preferably greater than 2.5. The organopolysiloxane resins are methylsiloxanes, or resins which contain both monomethyl and dimethyl or monophenyl units. There may also be used ethylsiloxane resins in which the ratio R"Si is 1.4 to 1 and which mixture contains 15 percent of butoxy groups or there may be used resins in which the ratio R:Si is 1.1 to 1 and which contain 10 percent of methoxy groups or there may be used methyl-phenyl-siloxane resins containing 50 percent of monomethyl units, 25 percent of dimethyl units and 25 percent of monophenyl units.

Other suitable cross-linking agents are organohydrogenpolysiloxanes of the formula, (5) $R^3{}_aHSiO_{(3-a)/2}$ 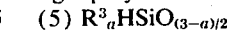

in which R is an alkyl or aryl radical and $a$ is a number less than 2 but is not zero. The organohydrogenpolysiloxane cross-linking agents have the disadvantage that during curing there is evolved hydrogen gas which can result in bubbles being trapped in the silicone rubber composition. Although the above cross-linking agents can be used in the compositions, the organosilicates of formula (1) are preferred since the processability of the composition is facilitiated and the cured silicone rubber composition has better physical properties. A more detailed description of these other cross-linking agents is to be found in Nitzsche et al U.S. Pat. No. 3,127,363.

There is incorporated into the organopolysiloxane fluid of formulas (2) and (3) a filler which may be of the reinforcing filler type or of the semi-reinforcing type. Generally, the reinforcing fillers have 100–300 square meter surface areas per gram while the semi-reinforcing fillers have a surface area of 1–20 square meters per gram. The reinforcing fillers are added when it is desired to have a high strength silicone rubber composition, that is a composition with high values for tensile strength and per cent elongation. Illustrative of the many fillers which can be employed are titanium dioxide, lithopone, zinc oxide, zirconium silicate, silica aerogel, iron oxide, diatomaceous earth, calcium carbonate, fumed silica percipitated silica, glass fibers, magnesium oxide, chromium oxide, zirconium oxide, aluminum oxide, crushed quartz, calcined clay, asbestos, carbon, graphite, cork, cotton and synthetic fibers. There can also be used silica filler treated with an organo cyclic trimer or tetramer such that the filler is hydrophobic. Generally, there can be added to said diorganopolysiloxane of formulas (3) and/or (3), 10 to 300 percent by weight of filler and preferably 10–50 percent by weight. It is desirable to add more than 50 percent by weight of filler only when the resulting silicone rubber composition is to be used for roof topping the other uses other than for dental impressions and ear plugs.

When the filler has been added to the polysiloxanes of formulas (2) and (3), it is desirable that the resulting mixture have a viscosity of $15 \times 10^6$ to $25 \times 10^6$ centipoise at 25°C when the mixture is to be used to form ear plugs, dental molds, etc. A mixture with this viscosity is a thick paste that is thixotropic and does not have any cold flow. Such a paste-like material is suitable to be handled manually and be molded to the required shape whether for forming dental impressions or ear plugs or other items. If more than 50 percent by weight of filler is added to the $3 \times 10^6$ to $4.5 \times 10^6$ centipoise material, then the mixture is difficult to mold. Further, the $3 \times 10^6$ to $4.5 \times 10^6$ centipoise material with 50 percent by weight of filler, while manually handleable, also has the advantage that it is very good in picking up details and is easily pushed into voids such as, for instance, in cavities in the ear to form the required molded piece. Further, less filler than 50 percent can be used with polymer material having viscosities in the range of $4.5 \times 10^6$ to $25 \times 10^6$ centipoise at 25°C to arrive at compositions suitable for making dental impressions or ear plugs. If the organopolysiloxane and filler mixture has a viscosity above $25 \times 10^6$ centipoise at 25°C, it will not be able to pick up good details and will only partially fill cavities in forming molded pieces.

The other necessary component in this silicone rubber composition is a catalyst. It has been found that only certain metallic salts of organic carboxylic acids and dicarboxylic acids may be employed with the organopolysiloxanes of formulas (2) and (3) as a curing catalyst. Suitable acid radicals are the recinate, linoleate, stearate, oleate, as well as the lower radicals such as acetate, butyrate, octoate and other which form the necessary metallic salts. Preferably, metallic salts of lauric acid have been found to be especially effective. The metal ion of the metal salt is one selected from the class consisting of lead, tin, zirconium, antimony, iron, cadmium, barium, calcium, titanium, bismuth and manganese. Thus, examples of suitable metallic salt catalysts are tin naphthenate, lead octoate, tin octoate, iron stearate, tin oleate, antimony octoate, tin butyrate, basic dibutyl tin laurate and dibutyl tin dilaurate. The tin and lead salts are preferred since they are usually soluble in the diorganopolysiloxanes of formulas (2) and (3) and since they have enhanced catalytic activity in combination with the alkyl silicate. It is important to note that other compounds which would be expected to exercise good catalytic activity in the mixture of diorganopolysiloxane, filler and alkyl silicate exercised no catalytic activity whatsoever. This class of compounds are zinc salts of organic acids, cobalt oleate, cobalt naphthenate, manganese naphthenate, nickel naphthenate and calcium stearate. Generally, 0.1 to 5 percent by weight of the metallic salt is used based on the weight of the diorganopolysiloxane.

In mixing the above ingredients, the organopolysiloxane polymer is mixed with the filler and the alkyl silicate is mixed with the metallic salt so that there are two components present. These two components are not mixed together until it is necessary or desirable for the curing of the composition to begin. In one embodiment, the alkyl silicate and metallic salt can be placed in a small bag which is located inside a larger bag containing the diorganopolysiloxane and filler. The inner bag can be kneaded so that it breaks and the two components thereby are mixed in the large bag. The larger bag is then opened and the contents inserted into the ear for instance, in making ear plugs. There is approximately 10 minutes work time available to mix the two components together and to mold the resulting mixture on the surface to be reproduced. Thus, there would be 5-10 minutes time to mix the two components together and then take the resulting putty-like mass and fill the center of the ear therewith. After molding the putty-like material to the desired degree, no cold flow was observed. Within 20-30 minutes after the initial mixture of the components and at ambient temperature, the materials had achieved a sufficient degree of cure (Shore A hardness 15) to be removed without causing deformation of the material. After one hour the silicone rubber mixture cures to approximately 80 percent of the final Shore A hardness. After six hours very little additional change in hardness occurs. A more detailed description of the two-component package, as well as the method for forming ear plugs as well as the shape and form of the ear plug is to be found in the copending application of Theodore K. Johnson and Joseph Sataloff, entitled "Hearing Protecting Device", Ser. No. 75,877 filed Sept. 28, 1970 and now abandoned.

The above-described two component room temperature vulcanizable composition may be used for void filling, mold making, encapsulating, sealing or caulking compounds, glazing compounds or tapes and injection molding compounds. Further, because of the low toxicity of the components, the room temperature vulcanizable silicone rubber composition may be used for producing medical or dental impression compounds, custom fit attachments, attachment of devices to the body and prosthetic devices.

The compositions of the present invention are also useful for making dental impressions. Plugs of the diorganopolysiloxane, a filler, the metallic salt of the carboxylic acid and the cross-linking agent are placed in the mouth of the patient and impressions made of either his tooth or gums. The impression is then removed and allowed to harden to room temperature so that the cut can be used to make plates for the patient. The present compositions are especially suitable for the reasons given above and because of low toxicity.

As has been stated previously, the present composition can be used to encapsulate electrical components, for gasket materials, shock absorbers and other applications where the use of natural or synthetic rubber is not desirable.

In many uses it is desirable to have tough films of silicone compounds which can be used in situ. Thus, for many years it has been desired to produce a roofing which is more durable than the present asphalt tiles used for roofing and which is further resistant and uneffected by extreme weather conditions. It has been suggested that room temperature vulcanizable compositions be used to cover the wooden boards which form the roof in place of boards covered with asphalt, the present tiles, or a built up roof of asphalt and stone. However, room temperature vulcanizable silicone rubber compositions presently available have limited toughness or tear strength. Such silicone rubber compositions have relatively low per cent elongation and tear strength so that the silicone rubber splits as the result of excessive expansion, contraction, and movement of the underlying substrate during extreme weather conditions. Further, because of their low tear strength, presently available silicone rubber compositions have a low abrasion resistance and do not hold up well under heavy foot traffic where the deck is also a walkway. It has been discovered that the silicone rubber compositions of the present invention are eminently suitable for forming tough films which have an elongation of above 200 percent, a toughness in excess of 100,000 psi and a tear strength in excess of 40 lb./in. and preferably in excess of 60 lbs/in.

These films are formed by taking the mixture of the diorganopolysiloxane, filler and forming a preferably 40 to 60 percent by weight solution in a suitable organic solvent. Examples of such solvents are cyclohexane, toluene, xylene, naphtha, mineral spirits and chlorinated solvents such as methylene chloride. The diorganopolysiloxane polymer for forming such solutions either is a single polymer or is a blend having a viscosity within the range of $3 \times 10^6$ to $25 \times 10^6$ centipoise at 25°C. When the resulting solution is ready for use, the metallic salt of the carboxylic acid and the cross-linking agent are mixed into the solution and the solution applied over the surface to be coated. After the surfaces have been so coated with the desired thickness of solution, the solvent evaporates to leave a film of the cured silicone rubber composition. In this manner, tough films of silicone rubber composition which are water repellant can be formed on roofings.

Such solutions may be cured to coat ear plugs which are formed from the silicone rubber compositions of the present invention so as to impart a smooth coating to the ear plug as well as impart to it added resistance to ear wax and moisture. Further, solutions of one-component silicone rubber compositions may be used to coat the ear plugs produced in accordance with the present invention so as to obtain a tighter fit in the ear canal and so as to impart added resistance to water composition moisture to the ear plug. Such one-component silicone rubber compositions solutions are disclosed in the copending application of Shaw, entitled "Solutions of Room Temperature Vulcanizable Silicone Rubber Compositions", Ser. No. 76,266, filed Sept. 28, 1970, now U.S. Pat. No. 3,701,753.

The present invention is illustrated by the examples given below. These examples are meant to illustrate the invention and are not intended to limit the scope of the invention.

EXAMPLES 1 and 2

Two mixtures were formed, A and B, where the A mixture comprised 100 parts of a dimethyl silanol-stopped oil having a viscosity of 3,000 centipoise at 25°C, mixed with 150 parts of 10 Micron Minusil, which is a ground quartz semi-reinforcing filler and the B mixture comprised 100 parts of the dimethylsilanol-stopped oil having a viscosity of 3,000 centipoise at 25°C mixed with 70 parts of Celite Superfloss which is diatomaceous silica, a semi-reinforcing filler. Both mixtures were cured with 4 weight per cent based on the weight of the mixtures of a curing composition formed from 3 parts of partially hydrolyzed ethyl silicate and 1 part of dibutyl tin dilaurate. The pre-cured composition had the following physical properties:

| Mixture | A | B |
|---|---|---|
| Work Time, Minutes | 25 | 33 |
| Tack-Free Time, Minutes | 45 | 50 |
| Catalyzed Processability | Sticky & Cold Flow | Stick & Cold Flow |
| Shore A Hardness | | |
| at 15 minutes | 0 | 0 |
| at 20 minutes | 0 | 0 |
| at 30 minutes | 0 | 0 |
| at 60 minutes | 16 | 0 |

ASTM slabs, whose dimensions were 0.075 inches × 6 inches × 6 inches and which were press-cured for 72 hours at 77°F and at 50 per cent relative humidity, were prepared from the mixture.

The physical properties of these slabs were:

| Mixture | A | B |
|---|---|---|
| Shore A Hardness | 70 | 73 |
| Tensile Strength, psi | 800 | 800 |
| Elongation, % | 100 | 100 |
| Tear Strength, lb/in. | 30 | 47 |
| Tensile Product, psi ($\times 10^{-4}$) | 8.0 | 8.0 |

It can be seen that with the mixtures A and B formed from a low viscosity dimethylpolysiloxane fluid, a low value for per cent elongation as well as for tensile product is obtained regardless of the amount of filler used. Further, the value for the tear strength is above 40 but considerably below 60, the preferred value for tear strength.

EXAMPLES 3 – 5

A mixture C was formed comprising 100 parts of a dimethyl silanol-stopped fluid having a viscosity of $1.5 \times 10^7$ centipoise at 25°C and 150 parts of 10 Micron Minusil, a semi-reinforced filler. A mixture D was formed comprising 100 parts of the dimethyl silanol-stopped fluid having a viscosity of $1.5 \times 10^7$ centipoise at 25°C and 70 parts of Celite Superfloss, semi-reinforcing filler. Then a mixture E was formed comprising 32.4 parts of the 3,000 centipoise dimethylpolysiloxane fluid, 67.6 parts of the $1.5 \times 10^7$ centipoise dimethylpolysiloxane fluid so that the blend had a viscosity of $3 \times 10^6$ centipoise, which blend was mixed with 150 parts of 10 Micron Minusil filler. All these materials were cured with 4 per cent by weight of a curing composition based on the weight of the mixture which composition is formed from 3.0 parts of a partially hydrolyzed ethyl silicate and 1.0 part of dibutyl tin dilaurate.

The properties of the pre-cured compositions are as follows:

| Mixtures | C | D | E |
|---|---|---|---|
| Work Time | 9 | 5 | 10 |
| Tack-Free Time, Minutes | 11 | 7 | 25 |
| Catalyzed Processability | Good | Good | Good |
| Shore A Hardness | | | |
| at 15 minutes | 18 | 25 | 4 |
| at 20 minutes | 22 | 33 | 9 |
| at 30 minutes | 30 | 37 | 18 |
| at 60 minutes | 35 | 45 | 35 |

ASTM slabs were prepared as in the previous examples from the cured compositions, which slabs were tested to yield the following physical properties:

| Mixtures | C | D | E |
|---|---|---|---|
| Shore A, Hardness | 58 | 58 | 62 |
| Tensile Strength, psi | 870 | 980 | 660 |
| Elongation, per cent | 230 | 290 | 200 |
| Tear Strength, lb/in. | 66 | 92 | 74 |
| Tensile Product, psi ($\times 10^{-4}$) | 20.0 | 28.4 | 13.2 |

As is noted from these results, the pre-cured mixtures C, D and E have a short work time and tack-free time and their processability is good as compared to the mixtures A and B. In particular, the only difference between the mixtures A, B and C, D is that in the former, a low viscosity silanol-terminated diorganopolysiloxane is used which in the latter a high viscosity silanol-terminated diorganopolysiloxane is present. The mixtures C, D and E yield better per cent elongation as well as tensile product than mixtures of A and B. The tear strength of all these mixtures is above 60. it can also be noted from these examples that the per cent elongation decreases as the amount of filler incorporated in the mixture is increased. However, it can also be noted that even with a high amount of filler, mixture C still had an elongation above 200 per cent and a tensile product above 200,000 psi.

EXAMPLES 6 – 7

A mixture F was formed by mixing 100 parts of a methyl-stopped dimethylpolysiloxane fluid having a viscosity of $1 \times 10^7$ centipoise at 25°C with 150 parts of 10 Micron Minusil semi-reinforcing filler. Then a mixture G was formed by mixing 100 parts of a methyl-stopped dimethylpolysiloxane fluid having a viscosity of $1 \times 10^7$ centipoise at 25°C with 70 parts of Celite Superfloss semi-reinforcing filler. These mixtures were cured with 2.0 weight per cent benzoyl peroxide based on the weight of the mixtures. The samples were cured at elevated temperatures of 130°C – 170°C and then ASTM slabs were press-cured 15 minutes at 280°F and then aged for one hour at 300°F. The resulting slabs were tested and yielded the following physical properties:

| Mixtures | F | G |
|---|---|---|
| Shore A, Hardness | 57 | 73 |
| Tensile Strength, psi | 380 | 590 |
| Elongation, per cent | 140 | 140 |
| Tear Strength, lb/in. | 30 | 59 |
| Tensile Product, psi ($\times 10^{-4}$) | 5.82 | 8.25 |

It is seen that the tensile strength, per cent elongation, tear strength and tensile product of the heat-cured silicone rubber is highly inferior to the values obtained from mixtures C, D and E.

EXAMPLES 8 – 10

A mixture H is prepared comprising 100 parts of the silanol-stopped dimethylpolysiloxane fluid having 3,000 centipoise viscosity at 25°C, 40 parts of Albacar 5970 which is a calcium carbonate semi-reinforcing filler, 20 parts of zinc oxide XX-78 which is a semi-reinforcing filler and 3.0 parts of partially hydroxylated ethyl silicate. This mixture is cured with 1.0 weight per cent stannous octoate based on the weight of the mixture.

A mixture I was formed with the same amount and same type of ingredients as mixture H and, in addition, having therein 2.5 parts of Thixcin R which is a hydrogenated castor oil, an organic thickening agent. This mixture was cured with 1.0 weight per cent stannous octoate based on the weight of the mixture.

There was prepared a mixture 3 by taking 33 parts of silanol-stopped dimethylpolysiloxane fluid having a viscosity of 3,000 centipoise at 25°C and blending it with 67 parts of the silanol-stopped dimethylpolysiloxane fluid having a viscosity of $1.5 \times 10^7$ centipoise at 25°C, which blend had the resulting viscosity of $3.0 \times 10^6$ centipoise at 25°C. The blend was mixed with 40 parts of Albacar 5970, 20 parts of zinc oxide XX-78 and 2.5 parts of partially hydrolyzed ethyl silicate having 40 percent by weight of $SiO_2$ in it. This mixture was cured at room temperature with 1.0 per cent by weight based on the mixture weight of basic dimethyl tin oleate.

The pre-cured mixture had the following physical properties:

| Mixtures | H | I | J |
|---|---|---|---|
| Work Time, Minutes | 2.5 | 2 | 7 |
| Tack-Free Time, Minutes | 5 | 5 | 15 |
| Catalyzed Processability | Sticky, No Cold Flow | Stick, No Cold flow | Slight Stickiness No Cold Flow |
| Shore A, Hardness | | | |
| at 15 minutes | 35 | 38 | 17 |
| at 20 minutes | 38 | 42 | 24 |
| at 30 minutes | 42 | 47 | 31 |
| at 60 minutes | 45 | 52 | 35 |

The short curing time and tack-free times as compared with the previous examples are the result of the use of the faster curing catalysts used in these examples. Of the three mixtures, one mixture, J, that is the mixture with the polysiloxane blend of $3 \times 10^6$ viscosity, has the desired catalyzed processability.

The cured silicone rubber compositions prepared from these mixtures were prepared in the form of ASTM slabs as in the previous examples so that their phrsical properties could be determined. These physical properties are:

| Mixtures | H | I | J |
|---|---|---|---|
| Shore A, Hardness | 55 | 55 | 37 |
| Tensile Strength, psi | 500 | 500 | 400 |
| Elongation, per cent | 150 | 150 | 300 |
| Tear Strength, lb/in. | 30 | 30 | 44 |
| Tensile Product, psi ($\times 10^{-4}$) | 7.5 | 7.5 | 12.0 |

The mixture J, with the high viscosity polysiloxane fluid, yields a per cent elongation that was twice the value of the per cent elongation of the other mixtures. In all the mixtures the same types and amounts of filler were used. Further, mixtures I, in which there was present the thickening agent, the per cent elongation was not improved. In addition, the high viscosity polysiloxane fluid in mixture J yielded a cured composition with a substantially higher tear strength and tensile product, which tensile product was above 100,000 psi. These examples demonstrate that although a rapid catalyst may be used to reduce the tack-free time and that although a thickening agent may be used to increase the viscosity of the low viscosity polysiloxane mixture, the low viscosity polysiloxane mixtures yield cured silicone rubber with inferior physical properties, as compared to the high viscosity polysiloxane mixture. Mixtures C, D, E and J which were produced with high viscosity ($3 \times 10^6$ centipoise and $1.5 \times 10^7$ centipoise) polysiloxane fluid yield the best combination of processing properties and physical properties as compared to the low viscosity polysiloxane mixtures when the same type and amount of filler and same types of catalyst were used.

It is important to note that the type and quantity of filler used in the above mixtures has an important effect on the physical properties of the cured silicone rubber compositions. In all the above examples, semi-reinforcing fillers were used. As might be expected, better physical properties may be obtained by using reinforcing fillers. It was important to keep the type and amount of filler in the mixtures of the above examples the same so as to determine the effect of the high viscosity polysiloxane fluid over the low viscosity polysiloxane fluid. However, in order to point out the improved effects in physical properties which is brought about by using a reinforcing filler, the following illustrative examples are given.

EXAMPLES 11 – 12

A composition K was formed by mixing 100 parts of a silanol-stopped dimethylpolysiloxane fluid having a viscosity of $1.5 \times 10^7$ centipoise at 25°C with 27.5 parts of hexamethylsilazane treated reinforcing fumed silica filler. The untreated silica filler is known under the tradename of Cab-O-Sil. A composition L was formed by mixing 100 parts of a silanol-stopped dimethylpolysiloxane fluid having a viscosity of $1.5 \times 10^7$ centipoise at 25°C with 30 parts of hexamethylsilazane treated reinforcing precipitated silica. This untreated silica is known under the tradename QUSO G-32 and was dried in an air-circulating oven maintained at 140°C. These compositions K and L were cured at room temperature with 3 weight per cent based on the weight of the composition of a mixture of 3 parts of Ethyl Silicate-40 and 1 part of dibutyltindilaurate. From the cured compositions, ASTM slabs were formed which were treated as in the previous examples. These cured slabs yield the following physical properties:

| Materials | K | L |
|---|---|---|
| Shore A, Hardness | 37 | 45 |
| Tensile, psi | 1131 | 1240 |
| Elongation, per cent | 1000 | 900 |
| Tear Strength, lb/in. | 147 | 185 |
| Tensile Product, psi ($\times 10^{-7}$) | 113.1 | 111.6 |

It is seen that very highly superior physical properties are obtained when reinforcing silica filler is used with the high viscosity diorganopolysiloxane in the composition of the present invention.

What I claim is:

1. The process for obtaining silicone rubber compositions which are cured at room temperatures to the solid, elastic state comprising mixing
   a. a linear high molecular weight fluid organopolysiloxane containing terminal silicon-boned hydroxy groups and having a viscosity of $3 \times 10^6$ to $2 \times 10^8$ centipoise at 25°C where the organo groups are monovalent hydrocarbon radicals with 1-100% by weight of high molecular weight diorganopolysiloxane of a low molecular weight linear fluid diorganopolysiloxane containing terminal silicon-bonded hydroxy groups and having a viscosity of 100 to $3.0 \times 10^5$ centipoise at 25°C where the organo groups represent monovalent hydrocarbon groups,
   b. dispersing into the organopolysiloxane mixture 10–50 percent by weight of filler based on the weight of organopolysiloxane mixture;
   c. mixing in the above mixture and alkyl silicate selected from the class consisting of (1) a monomeric organo-silicate corresponding to the general formula,

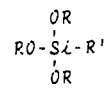

where R is a radical selected from the class consisting of alkyl, haloalkyl, aryl, haloaryl, aralkyl, alkenyl, cycloalkyl, cycloalkenyl and cyanoalkyl radicals and R' is selected from the class consisting of alkyl, haloalkyl, aryl, haloaryl, alkenyl, cycloalkyl, cycloalkenyl, cyanoalkyl, alkoxy and aryloxy radicals, and (2) a liquid partial hydrolysis product of the aforementioned organosilicate monomeric compounds and
   d. dispersing into the above resulting mixture a metallic salt of an organic monocarboxylic acid in which the metal ion is selected from the class consisting of lead, tin, zirconium antimony, iron, calcium barium, cadmium, titanium, bismuth, and manganese.

2. The process of claim 1 wherein the organo groups attached to said diorganopolysiloxanes are methyl groups.

3. The process of claim 2 wherein the alkyl silicate is polyethylsilicate and is present in an amount of 0.1 to 15 percent by weight of said high molecular weight and low molecular weight organopolysiloxanes.

4. The process of claim 3 wherein the metallic salt is used in the concentration of 0.1 to 5 percent by weight of the high molecular weight and low molecular weight diorganopolysiloxanes and said metallic salt is dibutyl tin dilaurate.

5. The process of claim 4 wherein the high molecular weight organopolysiloxane has a viscosity of $3 \times 10^6$ to $4.5 \times 10^6$ centipoise at 25°C.

6. The process of claim 4 wherein the blend of the low molecular weight organopolysiloxane and high molecular weight organopolysiloxane has a viscosity of $3 \times 10^6$ to $4.5 \times 10^6$ centipoise at 25°C and wherein the mixture of organopolysiloxanes with said filler has a viscosity of $15 \times 10^6$ to $25 \times 10^6$ centipoise at 25°C.

* * * * *